P. A. TOBEY.
HORSE POWER.

No. 100,818.  Patented Mar. 15, 1870.

Witnesses:
Chas. H. Spencer
Geo. W. Mabb

Inventor:
Preston A. Tobey
By J. Fraser & Co.
Atty

United States Patent Office.

PRESTON A. TOBEY, OF CATON, NEW YORK, ASSIGNOR FOR ONE-HALF HIS RIGHT TO STEPHEN TOBEY.

Letters Patent No. 100,818, dated March 15, 1870.

---

IMPROVEMENT IN HORSE-POWER.

---

The Schedule referred to in these Letters Patent and making part of the same.

---

*To all whom it may concern:*

Be it known that I, PRESTON A. TOBEY, of Caton, in the county of Steuben, and State of New York, have invented a certain new and useful Improvement in Horse-Powers; and I do hereby declare that the following is a full and exact description of the same, reference being had to the accompanying drawings making part of this specification, in which—

Figure 1:
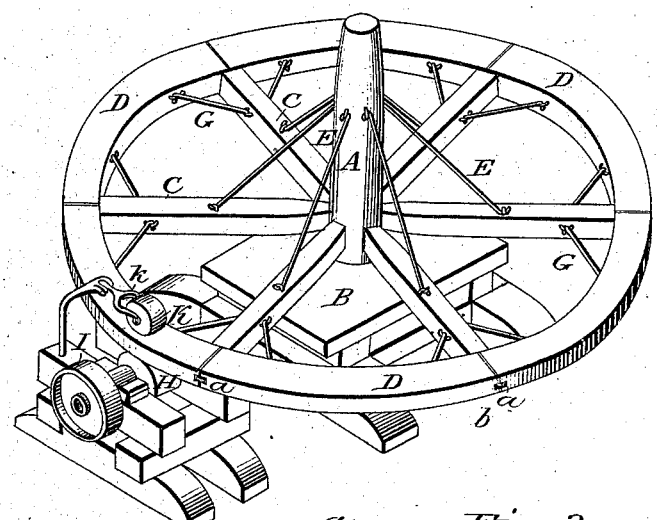

Figure 1 is a perspective view of my improvement, and

Figure 2:
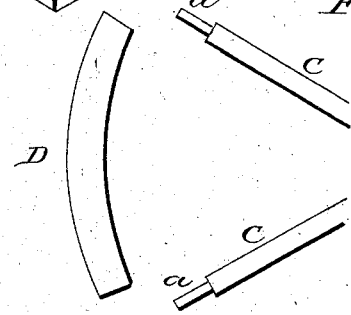

Figure 2, a diagram, showing a section of the rim of the wheel removed from the spokes or arms.

Nature of the Invention.

My invention consists in the construction and arrangement of the wheel, whereby any section of the rim may be removed, for the purpose of placing the horse inside; or the rim and spokes may be removed, for transportation or storage.

General Description.

In the drawings—

A represents the shaft or spindle of the wheel, which rests in a suitable bearing, B;

C C represent the spokes or arms; and

D D represent the several sections of the rim.

The inner ends of the spokes have tenons, which rest loosely in the sockets of the shaft. The outer ends of the same also have shouldered tenons *a a*, which receive half sockets, *b b*, of the rim-sections, which fit loosely thereon, with the ends of the sections abutting, as clearly shown.

The spokes are stayed vertically from the shaft by hook-rods E E, and the rim-sections are held to the spokes by hooks or hasps G G.

As these rods and hooks are detachable, it will be seen that the rim may be removed from the spokes, and the spokes from the shaft, at pleasure, thereby separating the whole wheel.

To attach the horse, I simply remove any one of the rim-sections, and place him inside, and connect him with the whiffletree, when the rim is closed up again.

For transportation and storage, the rim and the spokes are detached, and the shaft withdrawn from place, when the whole packs in close compass.

The essential novelty in this case consists in the above-described construction of the wheel for accommodating the application of the power, and for packing the parts compactly.

Another essential feature is the employment of hooks E and G, the former sustaining the spokes, while the latter holds the rim.

If desired, other rods may be used to connect the several spokes horizontally, though, in general, the bracing action of the outer rim is sufficient for that purpose.

The loose construction of the rim and spokes would be of little avail without the stay-rods and hooks, which form an important part of the combination.

The power from the wheel may be transmitted in any desired manner. In the drawings, the rim is shown as bearing upon a friction-gear, H, from which it is transmitted by band connected with pulley I.

If desired, the under side or outer edge of the rim may have cog-teeth, to engage with suitable gearing; or a large band may pass around the rim, connecting with an outside pulley.

In all these appliances it will be noticed, as an important advantage, that the horse inside the wheel has a free pathway all around, and does not have to step over a tumbling-rod, as in most horse-powers of this kind.

When the friction-gear H is employed, I combine with the same a bearing-roller, K, on top the rim, which, if desired, may be hung to a jointed arm, *k*, in such a manner as to rise and fall with any inequality of the rim.

If desired, this roller may be used to swing or turn over, to accommodate the opposite motion of the wheel. It serves to retain the rim in place on the friction-gear, and to produce the necessary friction.

I do not claim broadly the application of a horse inside a wheel; nor do I claim broadly a wheel in which the rim or spokes are removable, as I am aware that similar ideas have been involved in other relations; but

What I claim is—

The construction and arrangement of the wheel with the removable rim-sections D D and spokes C C, and having combined therewith the hook-rods E G, in the manner and for the purpose specified.

Also, in combination with the above, the swiveled bearing-roller K, employed in connection with the friction-gear H, in the manner and for the purpose specified.

In witness whereof I have hereunto signed my name in the presence of two subscribing witnesses.

PRESTON A. TOBEY.

Witnesses:
 ALONZO TUCKER,
 J. S. BUCHANAN.